United States Patent
Arakawa et al.

(10) Patent No.: US 6,577,358 B1
(45) Date of Patent: *Jun. 10, 2003

(54) LENS FILM WITH CONDUCTIVE LENS LAYER OR CONDUCTIVE LAYER

(75) Inventors: Fumihiro Arakawa, Shinjuku-Ku (JP); Mitsuru Tsuchiya, Shinjuku-Ku (JP); Hiroomi Katagiri, Shinjuku-Ku (JP); Taiji Suga, Shinjuku-Ku (JP); Tadahiro Masaki, Shinjuku-Ku (JP)

(73) Assignee: Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 09/102,900

(22) Filed: Jun. 23, 1998

(30) Foreign Application Priority Data

Jun. 25, 1997 (JP) .............................. 9-183193
Jul. 1, 1997 (JP) .............................. 9-188936

(51) Int. Cl.⁷ .................... G02F 1/1335; G02B 9/00
(52) U.S. Cl. .................. 349/57; 349/61; 359/642
(58) Field of Search ............. 349/57, 61; 359/599, 359/642

(56) References Cited

U.S. PATENT DOCUMENTS

| | | | | |
|---|---|---|---|---|
| 4,218,302 A | * | 8/1980 | Dalisa et al. | 204/299 R |
| 4,429,323 A | * | 1/1984 | Ohtsuka | 346/153.1 |
| 4,938,569 A | * | 7/1990 | Tsunoda et al. | 350/336 |
| 5,118,924 A | * | 6/1992 | Mehra et al. | 250/211 J |
| 5,126,882 A | * | 6/1992 | Oe et al. | 359/619 |
| 5,165,992 A | * | 11/1992 | Yajima | 428/328 |
| 5,196,960 A | * | 3/1993 | Matsuzaki et al. | 359/453 |
| 5,449,709 A | * | 9/1995 | Imae et al. | 524/154 |
| 5,451,766 A | * | 9/1995 | Van Berkel | 250/208.1 |
| 5,471,036 A | * | 11/1995 | Sperbeck | 219/522 |
| 5,492,762 A | * | 2/1996 | Hirai et al. | 428/447 |
| 5,581,379 A | * | 12/1996 | Aoyama et al. | 349/5 |
| 5,598,280 A | * | 1/1997 | Nishio et al. | |
| 5,764,319 A | * | 6/1998 | Nishihara | 349/8 |
| 5,797,668 A | * | 8/1998 | Kojima et al. | 362/31 |
| 5,805,358 A | * | 9/1998 | Yamashita et al. | 359/742 |
| 5,852,514 A | * | 12/1998 | Toshima et al. | 359/599 |
| 5,870,160 A | * | 2/1999 | Yanagawa et al. | 349/141 |
| 5,917,646 A | * | 6/1999 | Sheridon | 359/296 |
| 6,010,778 A | * | 1/2000 | Kimura et al. | 428/328 |
| 6,028,654 A | * | 2/2000 | Tanaka et al. | 349/138 |

FOREIGN PATENT DOCUMENTS

| | | | | |
|---|---|---|---|---|
| JP | 03-280574 A | * | 12/1991 | |
| JP | 4-42139 | * | 2/1992 | |
| JP | 4-63334 A | * | 2/1992 | |
| JP | 04-134441 A | * | 5/1992 | |
| JP | 05-325749 A | * | 10/1993 | |
| JP | 5-297339 A | * | 11/1993 | |
| JP | 9-63355 | * | 3/1997 | |
| JP | 2-608937 | * | 5/1997 | |
| JP | 10-170913 A | * | 6/1998 | |

* cited by examiner

Primary Examiner—Tarifur R. Chowdhury
(74) Attorney, Agent, or Firm—Parkhurst & Wendel, L.L.P.

(57) ABSTRACT

A lens film including a transparent substrate film and a concave or convex lens layer provided on a side of the substrate film. The lens layer contains a resin composition with conductive fine particles dispersed therein and has a surface resistivity of not more than $10^{12}$ $\Omega/\square$. Another embodiment is a lens film including a transparent substrate film, a conductive layer provided on a side of the substrate film, and a concave or convex lens layer provided on the conductive layer, the conductive layer having a surface resistivity of not more than $10^{12}$ $\Omega/\square$. The lens film can be part of a surface light source where the light-receiving side of the lens film is disposed on the light outlet side. The surface light source can be part of a liquid crystal display device.

3 Claims, 5 Drawing Sheets

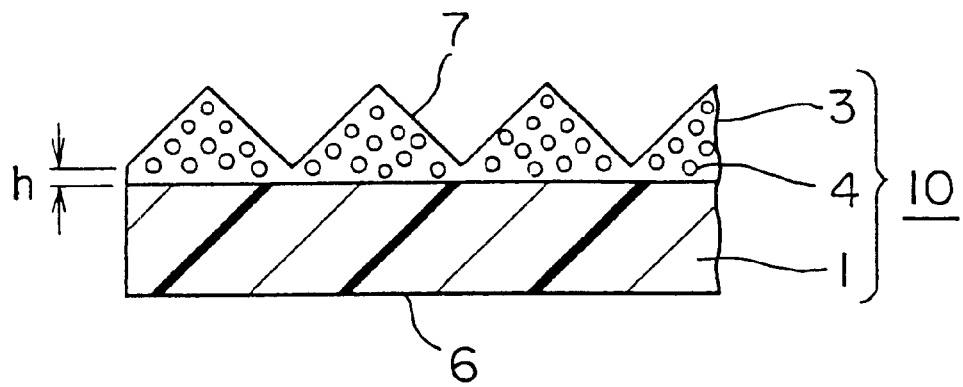
F I G. 1
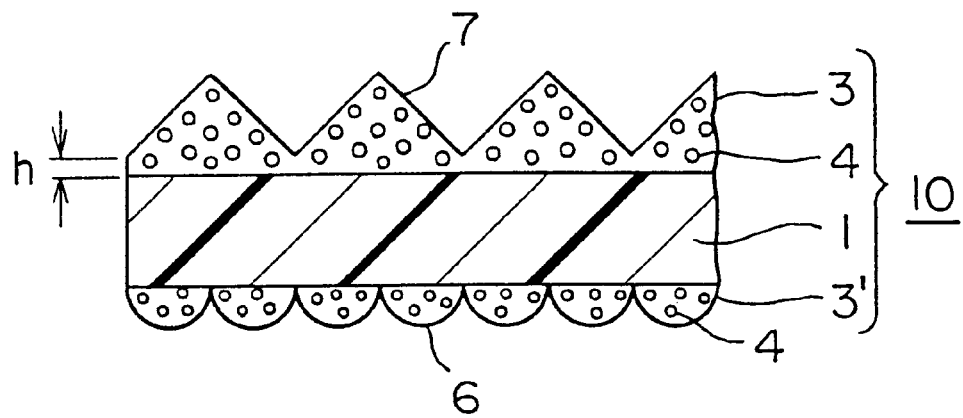
F I G. 2
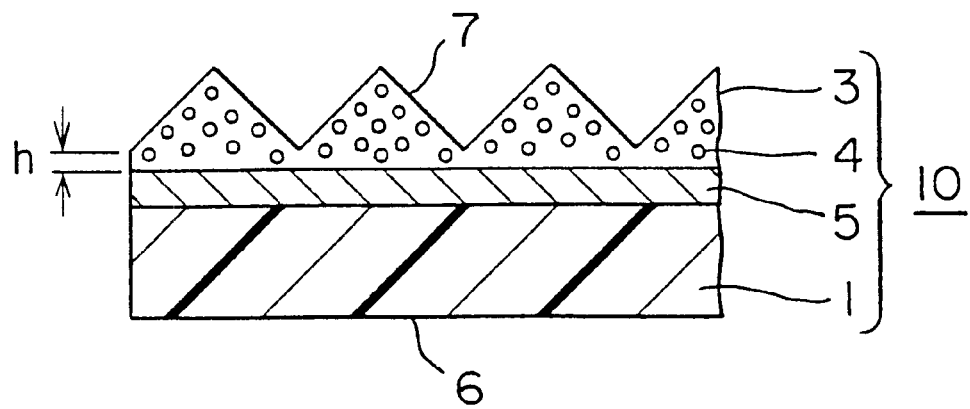
F I G. 3

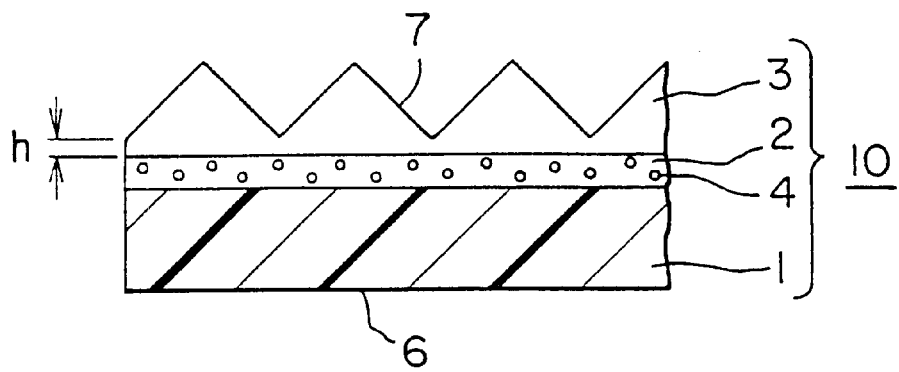
F I G. 4
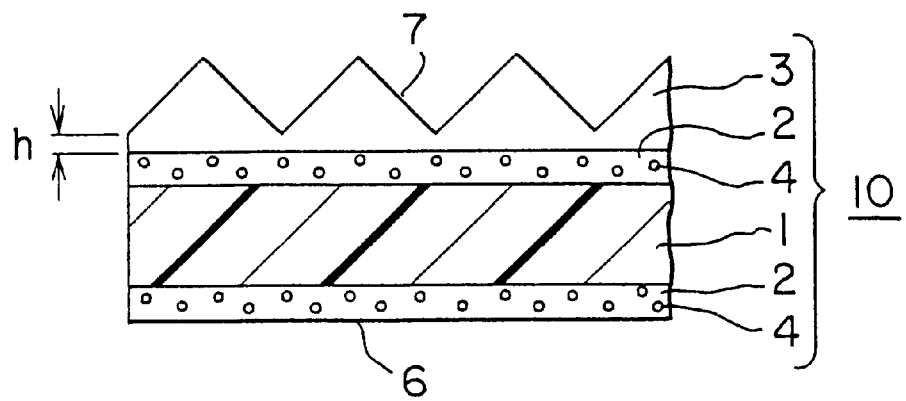
F I G. 5
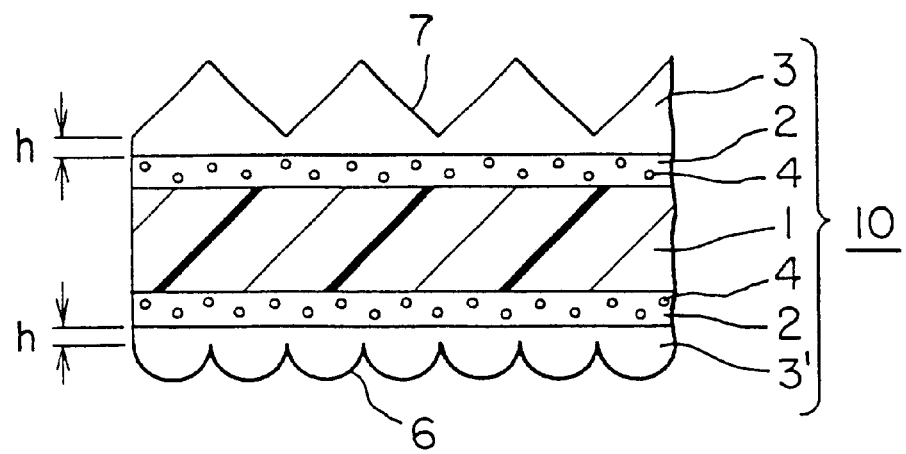
F I G. 6

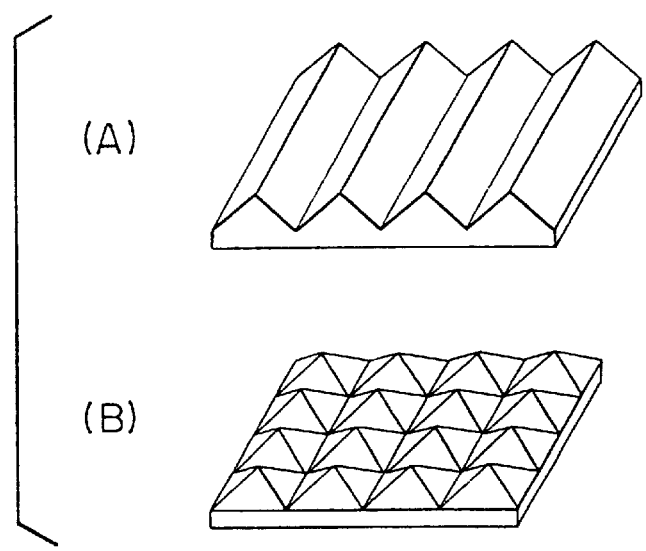
F I G. 9
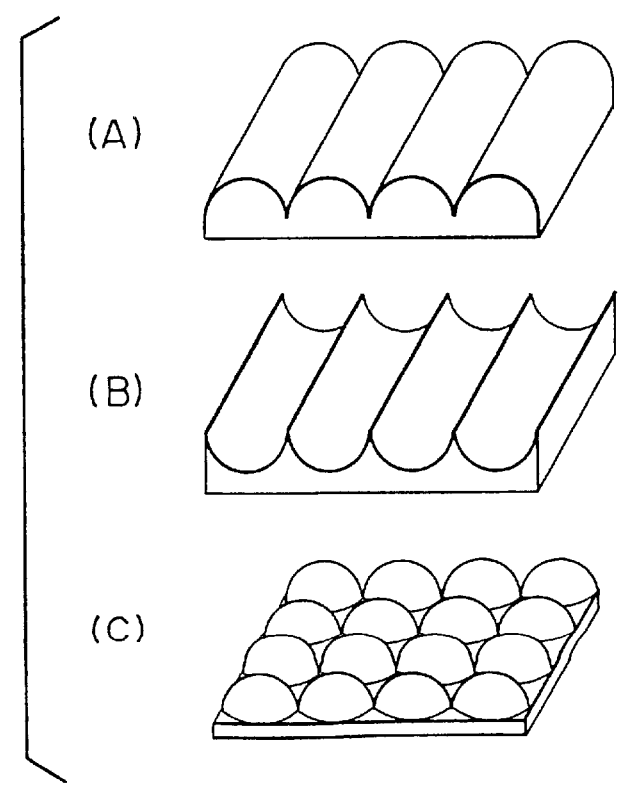
F I G. 10

LENS FILM WITH CONDUCTIVE LENS LAYER OR CONDUCTIVE LAYER

BACKGROUND OF THE INVENTION

1. Field of the Invention

The present invention relates to a lens film possessing excellent antistatic properties, and more particularly to a lens film suitable for displays of word processors, computers, televisions and other applications by virtue of an antifouling property of the surface thereof against dust and freedom from uneven adhesion at the time of lamination, and a surface light source and a liquid crystal display device using the same.

2. Background Art

Lens films incorporated as a component into displays for electronic equipment, such as personal computers and word processors, and other various commercial displays have a lens layer comprising a substrate film one side of which has been embossed, or comprising a shaped and cured thermoplastic resin or ultraviolet-cured resin provided on a transparent substrate film. In use, these lens films have been incorporated into liquid crystal display devices and the like.

When the lens film is used together with a surface light source device for assembling, a protective film covering the lens film should be separated and removed. This has involved a problem that static electricity is created at the time of separation of the protective film, which is causative of the deposition of foreign materials onto the surface light source device.

Further, in many cases, two lens films are used in such a manner that the prismatic ridge line of one of the lens films is orthogonal to the prismatic ridge line of the other lens film. At that time, the prismatic surface of the lower lens film and the flat surface of the substrate of the upper lens film are partially adhered to each other due to the influence of static electricity, and, even after the incorporation of the assembly into a liquid crystal display device, uneven adhesion unfavorably creates display of an image having unacceptable poor quality.

In order to prevent the creation of static electricity, an attempt has been made to coat the surface of a concave or convex lens with an antistatic agent to provide an antistatic layer as shown in FIG. 8. Evenly providing the antistatic layer is highly difficult from a technical viewpoint. In this case, the appearance of the lens film and the image in the liquid crystal display device become uneven, posing problems such as remarkably deteriorated optical properties and separation of the antistatic layer.

A method for the formation of a conductive thin layer by the deposition of a metal or the like has also been disclosed. However, evenly providing a metal deposit onto a concave or convex lens is difficult, disadvantageously leading to a variation in optical properties and a high cost.

SUMMARY OF THE INVENTION

An object of the present invention is to provide a lens film free from the above problems of the prior art.

The above object can be attained by a lens film of the present invention provided with specific antistatic means.

According to one aspect of the present invention, there is provided a lens film comprising: a transparent substrate film; and a lens layer of a concave lens or a convex lens provided on at least one side of the substrate film, wherein the lens layer comprises a resin composition with conductive fine particles dispersed therein and has a surface resistivity of not more than $10^{12}$ $\Omega/\square$.

According to another aspect of the present invention, there is provided a lens film comprising: a transparent substrate film; a conductive layer provided on at least one side of the substrate film; and a lens layer of a concave lens or a convex lens provided on the conductive layer, the conducive layer having a surface resistivity of not more than $10^{12}$ $\Omega/\square$.

Further, the present invention provides a surface light source comprising the above lens film, the lens film in its light-receiving side being disposed on the light-outlet side.

Furthermore, the present invention provides a liquid crystal display device comprising the above surface light source.

The lens film of the present invention provided with the above specific antistatic means can effectively prevent the generation of static electricity. Therefore, even immediately after the removal of the protective film in the lens film, the amount of electrification is small. Further, problems involved in assembling of a surface light source device attributable to static electricity can be solved such as deposition of foreign materials due to static electricity generated at the time of separation of a protective film from the lens film and uneven adhesion observed in use of two lens films in such a manner that the prismatic ridge line of one of the lens films is orthogonal to the prismatic ridge line of the other lens film.

BRIEF DESCRIPTION OF THE DRAWINGS

FIG. 1 is a schematic sectional view showing a basic construction of an embodiment of a lens film according to a first aspect of the present invention;

FIG. 2 is a schematic sectional view showing another embodiment of the lens film according to the first aspect of the present invention;

FIG. 3 is a schematic sectional view showing a further embodiment of the lens film according to the first aspect of the present invention;

FIG. 4 is a schematic sectional view showing a basic construction of an embodiment of a lens film according to a second aspect of the present invention;

FIG. 5 is a schematic sectional view showing another embodiment of the lens film according to the second aspect of the present invention;

FIG. 6 is a schematic sectional view showing a further embodiment of the lens film according to the second aspect of the present invention;

FIGS. 9A and 9B are perspective views showing embodiments of concavo-convex lenses;

FIGS. 10A to 10C are perspective views of other embodiments of concavo-convex lenses;

DETAILED DESCRIPTION OF THE INVENTION

Figure 7:
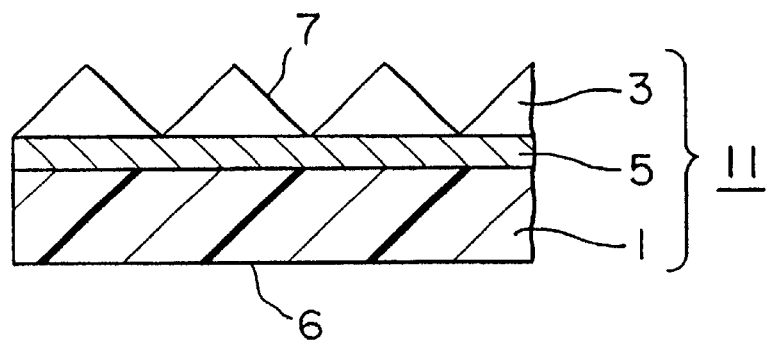
FIG. 7 is a schematic sectional view showing one embodiment of a conventional lens film.

A lens film 10 according to the first aspect of the present invention, as shown in FIG. 1, basically comprises: a transparent substrate film 1; and a lens layer 3 of a concave lens or a convex lens provided on at least one side of the substrate film. The lens layer 3 comprises a resin composition with conductive fine particles 4 dispersed therein and has a surface resistivity of not more than $10^{12}$ Ω/□.

A lens film 10 according to the second aspect of the present invention, as shown in FIG. 4, basically comprises: a transparent substrate film 1; a conductive layer 2 provided on at least one side of the substrate film; and a lens layer 3 of a concave lens or a convex lens provided on the conductive layer, the conductive layer 2 having a surface resistivity of not more than $10^{12}$ Ω/□. In FIG. 4, the conductive layer comprises a resin composition with conductive fine particles dispersed therein.

Figure 8:
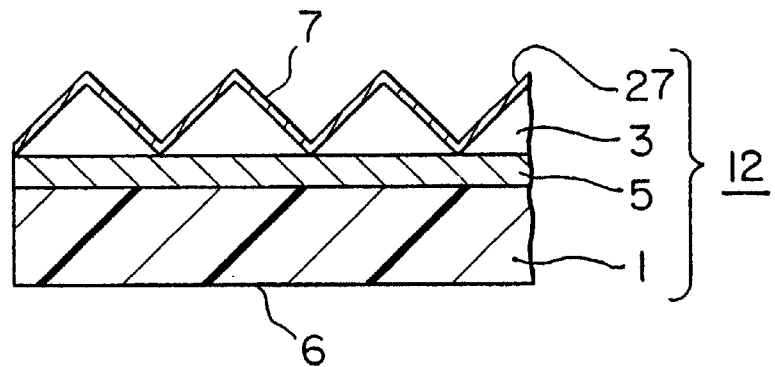
FIG. 8 is a schematic sectional view showing a conventional lens film comprising a lens layer having an antistatic layer.

The lens films of the present invention shown in FIGS. 1 and 4 have constructions different from a conventional lens film 11, as shown in FIG. 7, comprising a lens layer 3 simply provided on a primer layer 5 and a conventional lens film 12, as shown in FIG. 8, comprising an antistatic layer 27 provided on a lens layer 3.

Transparent substrate films usable for constituting the lens film of the present invention include stretched or unstretched films of thermoplastic resins, such as cellulose triacetate, polyesters, polyamides, polyimides, polypropylene, polymethylpentene, polyvinyl chloride, polyvinyl acetal, polymethyl methacrylate, polycarbonate, and polyurethane. Although the thickness of the transparent substrate film may vary depending upon the rigidity, it is preferably 50 to 200 μm from the viewpoint of handleability, such as workability.

For the transparent substrate film on its side where a lens layer is provided, treatment for improving the adhesion, such as corona discharge treatment, or provision of a primer layer 5 as shown in FIG. 3 is preferred from the viewpoint of stabilizing high adhesion between the substrate film and the lens layer.

The resin composition for constituting the lens layer of the present invention comprises an oligomer or a prepolymer of a (meth)acrylate (acrylate and methacrylate being hereinafter collectively referred to as "(meth)acrylate") of a polyfunctional compound, such as a polyhydric alcohol and a relatively large amount of a reactive diluent. Diluents usable herein include: monofunctional monomers, such as ethyl (meth)acrylate, ethylhexyl (meth)acrylate, styrene, vinyltoluene, and N-vinylpyrrolidone; and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When ionizing radiation curable resins as described above are used as ultraviolet curable resins, photopolymerization initiators, such as acetophenones, benzophenones, Michler's benzoyl benzoate, α-amyloxime esters, and thioxanthones, and photosensitizers, such as n-butylamine, triethylamine, and tri-n-butylphosphine, may be incorporated thereinto.

Further, the following reactive organosilicon compounds may be incorporated into the above ionizing radiation curable resins:

$R_mSi(OR')_n$ wherein R and R' represent an alkyl group having 1 to 10 carbon atoms and m+n=4, provided that m and n each are an integer. Specific examples thereof include tetramethoxysilane, tetraethoxysilane, tetra-isopropoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Alternatively, the lens layer 3 may be formed using a thermoplastic resin instead of the above reaction curable resin. Thermoplastic resins usable herein include, for example, acrylic resins, such as methyl methacrylate and ethyl methacrylate, polyesters, such as polyethylene terephthalate, polybutylene terephthalate, and polyethylene naphthalate, polycarbonate, polystyrene, polyhydrocarbons, such as polypropylene and polymethylpentene, polyamides, such as 6,6-nylon and 6-nylon, saponification products of ethylene-vinyl acetate copolymer, polyimides, polysulfone, polyvinyl chloride, and acetylcellulose.

The lens layer may be formed by coating the above thermoplastic resin having suitable hardness and shapeability or the above reaction curable resin in a liquid state onto a transparent substrate film or the surface of a conductive layer provided on the substrate film and then shaping the coating.

For the lens films, as shown in FIGS. 1 to 3, according to the first aspect of the invention, preferably, the lens layer thickness h in the recess section is not less than 1 μm, and electrical conductivity is imparted to the whole area of the lens film 10.

For the lens films, as shown in FIGS. 4 to 6, according to the second aspect of the present invention, preferably, the lens layer thickness h in the recess section is in the range of 0.5 to 4 μm.

In this case, a change in optical characteristics such as will cause the diffusion of light is not observed since conductive fine particles protruded on the transparent conductive layer are covered with the resin constituting the lens layer. The lens layer thickness h in the recess section is preferably not more than 4 μm from the viewpoint of the antistatic effect. When the thickness h exceeds 5 μm, the antistatic effect can be hardly observed.

Figure 12:
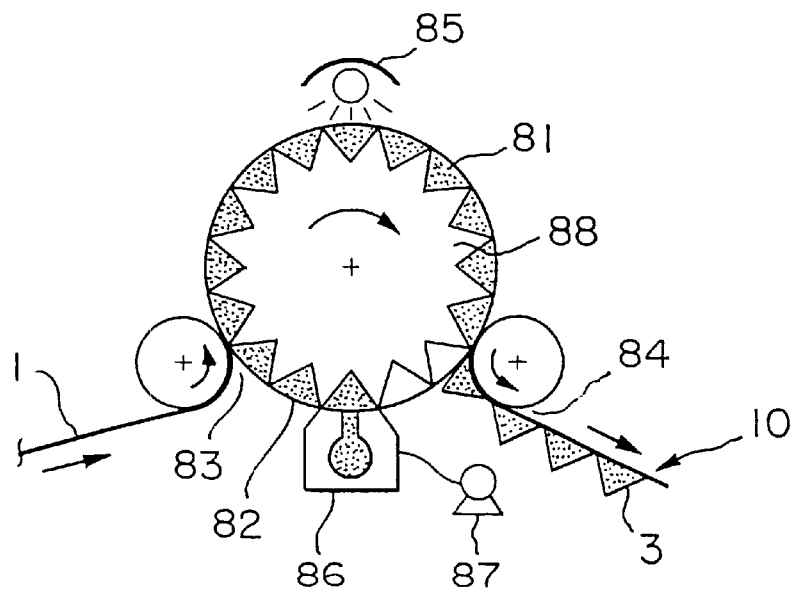
FIG. 12 is a schematic sectional view illustrating the step of forming a lens layer according to the present invention.

When the lens layer is formed using a reaction curable resin, use of a process, shown in FIG. 12, involving the steps of coating, shaping, and curing is preferred. Specifically, an ionizing radiation curable resin 82 optionally containing conductive fine particles 4 is fed by means of a pump 87 into a die head 86 and homogeneously forced into a plate cylinder 88 with a prismatic shape or the like formed therein. On the other hand, the surface of a transparent substrate film 1 or the surface of a conductive layer 2 provided on the transparent substrate film 1 is intimately contacted with the plate cylinder 88 at an inlet nip 83, and an ionizing radiation is applied by means of an ionizing radiation device 85 to form an ionizing radiation cured resin 81 and, at the same time, to adhere the ionizing radiation cured resin to the substrate film or the conductive layer. The lens layer 3 formed on the transparent substrate film 1 or the conductive layer is separated at the outlet nip 84 from the plate cylinder 88. Thus, a lens film 10 is formed.

When the lens layer is formed using a thermoplastic resin, a resin composition optionally containing conductive fine particles and, in addition, optional additives, such as a thermal stabilizer and a light stabilizer, is used. For example, if necessary, a primer layer for enhancing the adhesion is provided on a transparent substrate film or a conductive layer provided on the transparent substrate film. The resin composition in a heat-melted state is then extrusion-coated thereon. The coating is shaped by means of a cooling roll into a lens. Alternatively, the thermoplastic resin layer may be extrusion-coated and then cooled, followed by reheating/ melting to shape the layer. Thus, a lens film 10 is formed.

If necessary, a protective film may be laminated on the lens film 10.

The lens layer may be formed into any desired irregular shape, such as a prism as shown in FIG. 9(A), a pyramid as shown in FIG. 9(B), a semicylinder as shown in FIG. 10(A), a reversed semicylinder as shown in FIG. 10(B), or a hemisphere as shown in FIG. 10(C).

Conductive fine particles usable in the lens film (in the lens layer in the lens film according to the first aspect of the present invention and in the conductive layer in the lens film according to the second aspect of the present invention) of the present invention include fine particles of antimony-doped indium tin oxide (hereinafter referred to as "ATO") and indium tin oxide (hereinafter referred to as "ITO").

In the lens film according to the first aspect of the present invention, the composition of the lens layer in terms of the ratio of the conductive fine particles to the lens forming resin is generally such that the amount of the conductive fine particles is 0.1 to 5 parts by weight based on 100 parts by weight of the resin. When the amount of the conductive fine particles is less than 0.1 part by weight, the surface resistivity of the lens layer is likely to exceed $10^{12}$ $\Omega/\square$, while when the amount exceeds 5 parts by weight, the transparency of the lens layer is lowered.

In the lens film according to the second aspect of the present invention, the conductive layer is formed on the transparent substrate film by coating a coating liquid, for a conductive layer, comprising a thermoplastic resin or a binder composed mainly of a reaction curable resin on the transparent substrate film or by vapor deposition or sputtering of a metal oxide or the like on the transparent substrate film. The conductive layer may be formed, either directly or through a primary layer serving to enhance the adhesion, on the substrate film. The conductive layer may also have the function of the primer layer.

The conductive fine particles are provided so as to slightly protrude on the surface of the conductive layer, and the surface resistivity of the conductive layer is brought to not more than $10^{12}$ $\Omega/\square$.

The conductive layer may be coated by any conventional method, such as roll coating, gravure coating, bar coating, or extrusion coating.

The resin for constituting the conductive layer is selected from resins that have good adhesion to the substrate film, light resistance and moisture resistance, and good adhesion to the lens layer to be provided on the conductive layer.

Thermoplastic resins usable herein include linear polyesters, polyurethane, acrylic resin, polyvinyl butyral, polyamide, and vinyl chloride-vinyl acetate copolymer. If necessary, plasticizers and light stabilizers may be incorporated thereinto.

Reaction curable binders usable herein include ionizing radiation curable resins, such as polyester polyol polyisocyanate, polyether polyol polyisocyanate, polyacrylic polyol type polyol polyisocyanate, and epoxy polyisocyanate.

Aromatic and/or aliphatic diisocyanate and triisocyanate may be generally used as the polyisocyanate.

The composition of the lens layer in terms of the ratio of the conductive fine particles to the conductive layer forming resin is generally such that the amount of the conductive fine particles is 0.1 to 10 parts by weight based on 100 parts by weight of the resin. When the amount of the conductive fine particles is less than 0.1 part by weight, the surface resistivity of the lens layer is likely to exceed $10^{12}$ $\Omega/\square$, while when the amount exceeds 10 parts by weight, the transparency of the lens layer is lowered.

The thickness of the conductive layer formed by coating is generally 0.5 to 5 $\mu$m (the amount of coating in the specification being described on a solid basis; the same shall apply hereinafter), preferably 1 to 3 $\mu$m. When the thickness is less than 0.5 $\mu$m, it is difficult to bring the surface resistivity of the conductive layer to not more than $10^{12}$ $\Omega/\square$, while when the thickness is more than 5 $\mu$m, the transparency of the conductive layer is lost.

Further, provision of a primer layer having adhesion both to the substrate film and the transparent conductive layer is preferred from the viewpoints of stronger adhesion between the transparent conductive layer and the transparent substrate film and prevention of a lowering in adhesion with the elapse of time due to cold and heat, moisture absorption and desorption and the like.

The conductive layer may also be formed by vapor deposition or sputtering of a transparent metal or a metal oxide, such as ITO, ATO, gold, nickel, or zinc oxide/ aluminum oxide, or by coating a conductive polymer material, such as polypyrrole or polyaniline, on a transparent substrate film.

A primer layer 5 provided on the transparent substrate film as shown in FIG. 3 may comprise a thermoplastic resin or a varnish, composed mainly of a reaction curable resin, having adhesion both to the substrate film and the lens layer.

Thermoplastic resins usable herein include linear polyesters, polyurethane, acrylic resin, polyvinyl butyral, polyamide, and vinyl chloride-vinyl acetate copolymer. If necessary, plasticizers and light stabilizers may be incorporated thereinto.

Reaction curable resin varnishes usable herein include ionizing radiation curable resins, such as polyester polyol polyisocyanate, polyether polyol polyisocyanate, polyacrylic polyol type polyol polyisocyanate, and epoxy polyisocyanate.

Aromatic and/or aliphatic diisocyanate and triisocyanate may be generally used as the polyisocyanate.

The thickness of the primer layer formed by coating is generally 0.3 to 3 $\mu$m, preferably 0.5 to 2 $\mu$m. A thickness of less than 0.3 $\mu$m unfavorably causes uneven coating or blushing due to latent heat of vaporization of a solvent used for dilution of the coating liquid. On the other hand, a thickness exceeding 3 $\mu$m causes a change in optical characteristics.

The coating method is not particularly limited to gravure coating, roll coating, and bar coating. When the primer layer and the lens layer are formed by an identical step, the primer layer may have some tackiness because the primer layer can be cured simultaneously with the lens layer, or the lens layer can cover up the tackiness of the primer layer.

In the lens film according to the first aspect of the present invention, the conductive lens layer may be provided not only on one side of the substrate sheet 1 but also on both sides of the substrate sheet as shown in FIG. 2. The provision of the additional conductive lens layer can impart higher conductivity to the lens film. Further, focusing, diffusion and other properties may be imparted to the lens layer 3' on the side of a light-receiving face 6.

In the lens film according to the second aspect of the present invention, the conductive layer may be provided not only on one side of the substrate sheet 1 but also on both sides of the substrate sheet as shown in FIGS. 5 and 6. The provision of the additional conductive lens layer can impart higher conductivity to the lens film. Further, as shown in FIG. 6, a lens layer 3' having focusing, diffusion and other properties may be provided on the conductive layer 2 provided on the substrate sheet on the side of the light-receiving face 6 remote from the lens layer 3.

Figure 11:
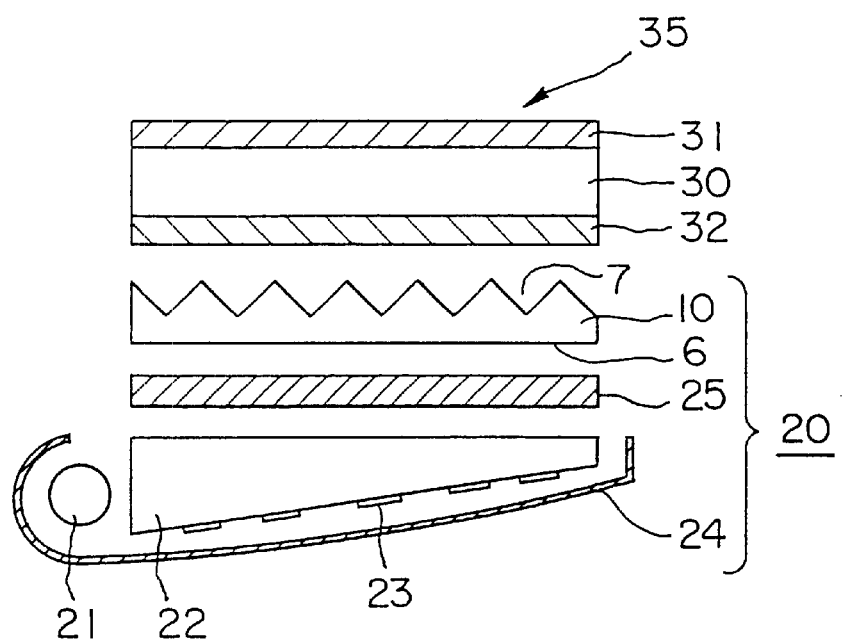
FIG. 11 is a cross-sectional view of a liquid crystal display device with the lens film of the present invention, together with a surface light source, being incorporated therein.

FIG. 11 is a cross-sectional view of a liquid crystal display device 35 using an edge type surface light source 20 which is one example of the application of the lens film according to the present invention. A light-guiding plate 22 having a diffusion pattern 23 is provided so as to face the light-receiving face 6 of a lens film, and a light source 21 is disposed on the side face of the light-guiding plate 22. A reflection sheet 24 is provided so as to surround the light-guiding plate 22 and the light source 21. Further, a diffusion film 25 and a lens film 10 are provided in that order on the light-guiding plate to construct a surface light source 20. A liquid crystal panel comprising a liquid crystal layer 30 sandwiched between a lower substrate 32 and an upper substrate 31 is provided on the side of a light-outlet face 7 of the lens film 10 to construct a liquid crystal display device 35.

In FIG. 11, only one lens film is used. Alternatively, two lens films may be laminated on top of the other in such a manner that the prismatic ridge line of one of the lens films is orthogonal to the prismatic ridge line of the other lens film. The ridge line of the lens film may be disposed orthogonally, parallel, or at any desired angle to a linear light source 21.

The following examples further illustrate the present invention.

EXAMPLE 1

As shown in FIG. 3, a coating liquid for a primer layer (tradename: Kemikaru Matto Nisu (Chemical Matt Varnish), manufactured by The Inctec Inc.) was coated on one side of a 125 $\mu$m-thick polyester film A-4300 (substrate film 1, manufactured by Toyobo Co., Ltd.) to form a 1 $\mu$m-thick primer layer 5. Subsequently, an epoxy acrylate [Z9002A (reaction curable resin), manufactured by Japan Synthetic Rubber Co., Ltd.] with 1.0% by weight of conductive fine particles of ATO dispersed therein was filled into and adhered to a prism plate, followed by irradiation with ultraviolet light to cure the epoxy acrylate, thereby preparing a lens film 10 in a prism form [apex angle 97°, pitch 50 $\mu$m, lens layer thickness h in recess section 3 $\mu$m].

A protective film of a low-density polyethylene film was laminated onto the lens layer in the lens film.

EXAMPLE 2

A coating liquid for a primer layer was coated on one side of the same substrate film as used in Example 1 to form a 1 $\mu$m-thick conductive layer 2. The coating liquid was the same as that used in Example 1, except that 1.0% by weight of conductive fine particles of ATO was dispersed in the coating liquid. Subsequently, a lens was formed in the same manner as in Example 1, except that the same epoxy acrylate Z9002A as used in Example 1, except for the absence of fine particles of ATO, was used as the resin for a lens layer. Thus, a lens film 10 having a lens layer in a prism form as shown in FIG. 4 [apex angle 97°, pitch 50 $\mu$m, lens layer thickness h in recess section 1 $\mu$m].

A protective film was laminated onto the lens layer in the lens film in the same manner as in Example 1.

EXAMPLE 3

The procedure of Example 2 was repeated, except that the lens layer thickness h of the recess section in the prism form was changed to 3 $\mu$m.

COMPARATIVE EXAMPLE 1

The procedure of Example 1 was repeated, except that the same resin composition for a lens layer as used in Example 1, except for the absence of fine particles of ATO, was used. Thus, a lens film 11, as shown in FIG. 7, having a lens layer in the same form as in Example 1 and not containing the conductive fine particles was prepared.

COMPARATIVE EXAMPLE 2

Electro Striper QN (a quaternary ammonium salt, manufactured by Kao Corp.) was diluted by 200 times with isopropyl alcohol to prepare a coating liquid which was then coated at a coverage of 0.1 g/m$^2$ on the lens layer in the lens film 11 prepared in Comparative Example 1. Thus, a lens film 12 provided with an antistatic layer 27 as shown in FIG. 8 was prepared.

COMPARATIVE EXAMPLE 3

ITO was sputtered to a thickness of 0.01 $\mu$m on the lens layer in the lens film 11 prepared in Comparative Example 1. Thus, a lens film 12 provided with an antistatic layer 27 as shown in FIG. 8 was prepared.

Lens films prepared in the examples and the comparative examples were evaluated as follows. The results are summarized in Table 1.

(1) Surface resistivity

The surface resistivity of the conductive layer or the conductive lens layer was measured with a resistivity meter (trade name MCP-HT260, manufactured by Mitsubishi Chemical Corporation). For the comparative lens films, the surface resistivity of the lens layer was measured.

(2) Luminance on back light

A diffusion film 25 was placed on a light-guiding plate 22 in an edge type back light as shown in FIG. 11, and each lens film was further placed thereon. The luminance in the normal direction was then measured with a luminance meter (BM-7, manufactured by Topcon Corp.). The luminance for Comparative Example 1 was presumed to be 100.

(3) Appearance on back light

A lens film was placed on the back light in the same manner as in the above (2), and the appearance (uneven transmitted light) of the lens film was visually inspected.

(4) Uneven adhesion

A lens film was placed on the back light in the same manner as in the above (2), and, immediately after the separation of the protective film, another lens film was put on top of the above lens film so that the ridge lines of the two lens films were orthogonal to each other. Uneven adhesion of the lens films on the back light was visually inspected.

(5) Amount of electrification

Immediately after the separation of a protective film applied to a lens film cut into a size of 10.4 cm×26.0 cm, the amount of electrification at a position distant by 10 cm from the lens layer was measured with an electrostatic checker.

TABLE 1

| | Surface resistivity ($\Omega/\square$) | Luminance ratio (%) | Appearance | Uneven adhesion | Amount of electrification (kV) |
|---|---|---|---|---|---|
| Ex. 1 | $1 \times 10^{12}$ | 98 | Good | Good | 0.02 |
| Ex. 2 | $5 \times 10^{11}$ | 95 | Good | Good | 0.02 |
| Ex. 3 | $1 \times 10^{12}$ | 98 | Good | Good | 0.02 |
| Comp. Ex. 1 | $>5 \times 10^{13}$ | 100 | Good | Failure | 0.10 |
| Comp. Ex. 2 | $5 \times 10^{11}$ | 85 | Uneven | Good | 0.01 |
| Comp. Ex. 3 | $5 \times 10^{3}$ | 70 | Uneven | Good | <0.01 |

What is claimed is:

1. A lens film capable of preventing generation of static electricity for use with a surface light source, the lens film consisting of:

a transparent substrate film;

a conductive layer to prevent generation of static electricity provided on at least one side of the substrate film; and a lens layer of a concave lens or a convex lens, the lens layer being provided directly on the conductive layer, said conductive layer comprising a resin composition with conductive fine particles dispersed therein and having a surface resistivity of not more than $10^{12}$ $\Omega/\square$, said lens layer having a thickness in a recess section of from 0.5 to 4.0 $\mu$m.

2. A surface light source comprising the lens film according to claim 1, the lens film in its light-receiving side being disposed on the light-outlet side.

3. A liquid crystal display device comprising the surface light source according to claim 1.

* * * * *